(12) United States Patent
Iwahara et al.

(10) Patent No.: US 12,391,195 B2
(45) Date of Patent: Aug. 19, 2025

(54) FIXING MEMBER AND FIXING STRUCTURE

(71) Applicant: DAIWA KASEI INDUSTRY CO., LTD., Okazaki (JP)

(72) Inventors: Toshio Iwahara, Okazaki (JP); Katsuya Hirakawa, Okazaki (JP); Makoto Kato, Okazaki (JP); Toshinori Muramoto, Nagoya (JP)

(73) Assignee: DAIWA KASEI INDUSTRY CO., LTD., Okazaki (JP)

( * ) Notice: Subject to any disclaimer, the term of this patent is extended or adjusted under 35 U.S.C. 154(b) by 0 days.

(21) Appl. No.: 18/483,580

(22) Filed: Oct. 10, 2023

(65) Prior Publication Data

US 2024/0123921 A1 Apr. 18, 2024

(30) Foreign Application Priority Data

Oct. 13, 2022 (JP) .................. 2022-164652

(51) Int. Cl.
*F16B 2/08* (2006.01)
*B60R 16/02* (2006.01)
*F16B 21/08* (2006.01)

(52) U.S. Cl.
CPC ............ *B60R 16/0215* (2013.01); *F16B 2/08* (2013.01); *F16B 21/086* (2013.01)

(58) Field of Classification Search
None
See application file for complete search history.

(56) References Cited

U.S. PATENT DOCUMENTS

| 8,286,924 B2 * | 10/2012 | Sano | F16B 21/086 |
| | | | 24/297 |
| D878,191 S * | 3/2020 | Kiyota | D8/394 |
| 2006/0016938 A1 * | 1/2006 | Wakabayashi | B60R 16/0215 |
| | | | 248/71 |
| 2007/0272807 A1 * | 11/2007 | Takagaki | B60R 16/0215 |
| | | | 248/71 |

(Continued)

FOREIGN PATENT DOCUMENTS

| JP | S58-106667 U | 7/1983 |
| JP | 2004-92713 A | 3/2004 |

(Continued)

*Primary Examiner* — Steven M Marsh
(74) *Attorney, Agent, or Firm* — McClure, Qualey & Rodack, LLP (57) ABSTRACT

Objects are: to make a fixing structure in which an engagement part of a fixing member is inserted and fixed in a through hole of a plate-shaped member, into a structure in which the fixing member is easily detached from the through hole and is less likely to be damaged or broken when being detached; and to, in doing so, maintain the dustproof and waterproof performance, the molding processability, and the elasticity of a dish-like contact portion of the fixing member at the conventional level, and suppress a size increase. To attain these objects, in a fixing structure, arc-shaped bent portions are respectively formed at both ends of a dish-like contact portion which annularly contacts a through hole surrounding portion from a near side in an insertion direction, and are guide portions for a detachment jig to enter the inside of the dish-like contact portion in the fixing structure.

5 Claims, 9 Drawing Sheets

(56) References Cited

U.S. PATENT DOCUMENTS

2018/0162296 A1\* 6/2018 Ootsuki .................. H02G 3/32
2020/0290531 A1\* 9/2020 Iwahara .............. B60R 16/0215
2021/0031709 A1\* 2/2021 Kato .................. B60R 16/0215

FOREIGN PATENT DOCUMENTS

| JP | 2008-141883 A | 6/2008 |
| JP | 2017-203488 A | 11/2017 |
| JP | 2019-161880 A | 9/2019 |

\* cited by examiner

FIXING MEMBER AND FIXING STRUCTURE

CROSS REFERENCE TO RELATED APPLICATIONS

This application claims priority on Patent Application No. 2022-164652 filed in JAPAN on Oct. 13, 2022. The entire contents of this Japanese Patent Applications are hereby incorporated by reference.

BACKGROUND OF THE INVENTION

Field of the Invention

This disclosure relates to a fixing member and a fixing structure.

Description of Related Art

A vehicle fixing member for fixing a wire harness to a vehicle body side in a state of holding the wire harness is formed as a resin injection-molded article including a holding part for holding a wire harness and an engagement part to be engaged and inserted into a through hole of a plate-shaped member (vehicle panel material) (see Japanese Laid-Open Patent Publication No. 2019-161880).

Specifically, the engagement part is provided with a support column, elastic locking pieces which are paired such that the support column is interposed therebetween and each extend from the upper end side toward the lower end side of the support column, and a dish-like contact portion which extends obliquely upward and outward in the radial direction of the support column from the lower end side of the support column so as to surround the support column. When the support column and the elastic locking pieces are inserted into the through hole of the plate-shaped member from the upper end side of the support column, the paired elastic locking pieces pass through the through hole with inward elastic deformation approaching the support column, and when a predetermined engagement position is reached, the elastic locking pieces elastically return (do not have to come into a fully returned state), each of locking portions at the distal ends of the elastic locking pieces presses outward an inner peripheral wall of the through hole and comes into a locking state of locking a surrounding portion of the through hole from the far side in the insertion direction, and the dish-like contact portion comes into a contact state of annularly contacting the surrounding portion of the through hole from the near side in the insertion direction. Accordingly, the engagement part comes into an engagement and fixation state where the plate-shaped member is sandwiched in the insertion direction.

In a fixing structure for the fixing member by this engagement part, in order to detach the engagement part from the plate-shaped member, conventionally, for example, a jig such as a flat-blade screwdriver is inserted between the plate-shaped member and the dish-like contact portion, and a projecting distal end portion of each elastic locking piece projecting downward from the through hole is pressed toward the support column side to become elastically deformed, thereby disengaging the engagement part. Then, the engagement part is pulled out in a direction opposite to the insertion direction.

However, in this conventional method, it is difficult to insert the jig such as a flat-blade screwdriver between the plate-shaped member and the dish-like contact portion which are strongly adhered to each other, and the engagement part cannot be easily detached. In addition, there is a possibility of damaging or breaking the plate-shaped member and the dish-like contact portion when inserting the jig between the plate-shaped member and the dish-like contact portion. It is difficult to reuse the damaged or broken fixing member even when the fixing member can be detached. On the other hand, even if it is possible to produce a new fixing member that can be detached such that the fixing member can be reused, it is difficult to adopt such a fixing member from the viewpoint of cost and the freedom of placement if the size of a dish-like contact portion is larger than that of a conventional product.

An object of this disclosure is to make a fixing structure in which an engagement part of a fixing member is inserted and fixed in a through hole of a plate-shaped member, into a structure in which the fixing member is easily detached from the through hole and is less likely to be damaged or broken when being detached. In addition, another object of this disclosure is to, in doing so, maintain dustproof and waterproof performance during insertion and fixation of the fixing member, processability with an injection mold, and the elasticity (flexibility) of a dish-like contact portion at the same level as in the conventional art, and suppress a size increase.

SUMMARY OF THE INVENTION

A fixing member for attaining the aforementioned objects is a fixing member including (provided with an engagement part including):
  a support column extending in an up-down direction;
  elastic locking pieces paired such that the support column is interposed therebetween in a right-left direction and each extending from a support column upper end side toward a support column lower end side; and
  a dish-like contact portion radially extending obliquely upward and outward from the support column lower end side so as to surround the support column, wherein
  by inserting the support column and the elastic locking pieces into a through hole of a plate-shaped member from the support column upper end side, the elastic locking pieces pass through the through hole with elastic deformation approaching the support column, and when the elastic locking pieces reach a predetermined engagement position, the elastic locking pieces elastically return (do not have to fully return to a natural state) and project downward from the through hole to lock a surrounding portion of the through hole from a far side in an insertion direction (upper side) while pressing an inner wall surface of the through hole, and the dish-like contact portion annularly contacts the surrounding portion of the through hole from a near side in the insertion direction (lower side) (to obtain an engagement and fixation state), thereby fixing (inserting and fixing) the fixing member to the plate-shaped member,
  the dish-like contact portion includes a bent portion which is bent obliquely downward and outward after the dish-like contact portion extends obliquely upward and outward,
  the bent portion is independently formed outside of each of connection positions of the elastic locking pieces with the support column in the right-left direction, and
  an upper surface of each bent portion forms a smoothly continuous curved surface around an axis of the support column, and is formed such that a direction from an outer edge of the curved surface when seen in an axial direction of the support column toward a lowest end of the elastic locking piece in a natural state (non-elastically deformed state) is directed upward.

A fixing structure for attaining the aforementioned objects is a fixing structure including:

a plate-shaped member provided with a through hole; and a fixing member provided with an engagement part including a support column extending in an up-down direction, elastic locking pieces paired such that the support column is interposed therebetween in a right-left direction and each extending from a support column upper end side toward a support column lower end side, and a dish-like contact portion radially extending obliquely upward and outward from the support column lower end side so as to surround the support column, wherein by inserting the support column and the elastic locking pieces into the through hole of the plate-shaped member from the support column upper end side, the elastic locking pieces pass through the through hole with elastic deformation approaching the support column, and when the elastic locking pieces reach a predetermined engagement position, the elastic locking pieces elastically return and project downward from the through hole to lock a surrounding portion of the through hole from a far side in an insertion direction while pressing an inner wall surface of the through hole, and the dish-like contact portion annularly contacts the surrounding portion of the through hole from a near side in the insertion direction, thereby engaging and fixing the engagement part to the plate-shaped member, the dish-like contact portion includes a bent portion which is bent obliquely downward and outward after the dish-like contact portion extends obliquely upward and outward, the bent portion is independently formed outside of each of connection positions of the elastic locking pieces with the support column in the right-left direction, and an upper surface of each bent portion forms a smoothly continuous curved surface around an axis of the support column, and is formed such that a direction from an outer edge of the curved surface when seen in an axial direction of the support column toward a lowest end of the elastic locking piece in a natural state is directed upward.

In the above configuration, since the bent portions are formed in the dish-like contact portion, it is easier to insert a jig such as a flat-blade screwdriver between the plate-shaped member and the dish-like contact portion. In addition, since it is easier to insert the jig, the possibility of damaging or breaking the fixing member is greatly reduced, so that it is possible to reuse the fixing member, thereby contributing to the Sustainable Development Goals (SDGs). In addition, since the bent portions are formed in the dish-like contact portion only on the sides on which the paired elastic locking pieces are located, the increase in size due to the bent portions can be minimized, and it is easy to grasp the position of a claw at a distal end of each elastic locking piece (i.e., the position where the jig is inserted). Moreover, since each bent portion slopes upward from the outer edge thereof toward the position of the lowest end of the elastic locking piece when seen in the axial direction of the support column, and forms a smoothly continuous arc-shaped curved surface around the axis, the access of the jig to a locking portion located below the elastic locking piece becomes good. That is, even if the insertion position of the jig is misaligned, it is possible to easily correct the direction in which the jig is directed to the locking portion. Furthermore, each bent portion is formed outside of the connection position of each elastic locking piece with the support column in the right-left direction. Since the elastic locking piece engaged with the surrounding portion of the through hole is bent at most to the vicinity of the connection position with the support column, if the bent portion is formed in a somewhat long arc-shaped curved surface around the axis of the support column, even if the insertion position of the jig is misaligned, the jig can be caused to reach the locking portion while correcting the direction of the jig such that the jig slides on the upper surface of the bent portion. In addition, since each bent portion is formed in the dish-like contact portion limitedly only on the side on which the elastic locking piece is located, the dustproof and waterproof performance, the processability with an injection mold, and the elastic ability (flexibility) of the dish-like contact portion of the fixing member are not impaired as compared to a conventional one.

Each bent portion can be formed such that a length of the bent portion in a radial direction with respect to the axis of the support column is longest on an outer side in the right-left direction with respect to the support column and becomes shorter with increasing distance therefrom around the axis, and can be formed so as to be smoothly connected on both end sides around the axis to non-formation portions, of the dish-like contact portion, in which the bent portion is not formed. In the above configuration, each bent portion is formed with a longer slope width (slope length) at a center portion of the arc shape outside the locking portion of the elastic locking piece such that the jig can be reliably guided, and is formed such that a slope width (slope length) becomes shorter with decreasing distance to both end portions of the arc shape, so that an unnecessary shape for extensive guidance for a jig insertion operation in which the jig is greatly misaligned can be omitted, and the increase in size can be minimized. In addition, on both end sides around the axis of the support column on which the slope width (slope length) of each bent portion is short, the bent portion approaches the non-formation portions, of the dish-like portion, in which the bent portion is not formed, such that the slope width (slope length) thereof decreases. Finally, the slope width (slope length) becomes zero, and the bent portion is connected to the non-formation portions. Therefore, no portion (recess, projection, or notch) by which the jig may become caught is formed in the dish-like contact portion. Thus, even if the jig is inserted from both end sides around the axis, it is possible to correct the direction of the jig and direct the jig to the locking portion.

Each bent portion can be formed such that the bent portion does not project downward from a lowest surface of the dish-like contact portion. For example, the bent portion can be prevented from projecting downward from a position whose distance from the top of the dish-like contact portion is ⅔ of the height (width in the up-down direction) of the dish-like contact portion. Accordingly, the extension of the dish-like contact portion due to the bent portion can be minimized while the insertion of the jig can be reliably guided.

A wire harness holding part (predetermined functional part) may be provided below the dish-like contact portion. With this configuration, when adding functions after a vehicle is sold, it is possible to, for example, replace or move a wire harness and reuse a removed wire harness, thereby contributing to the SDGs.

DETAILED DESCRIPTION

Figure 1A:
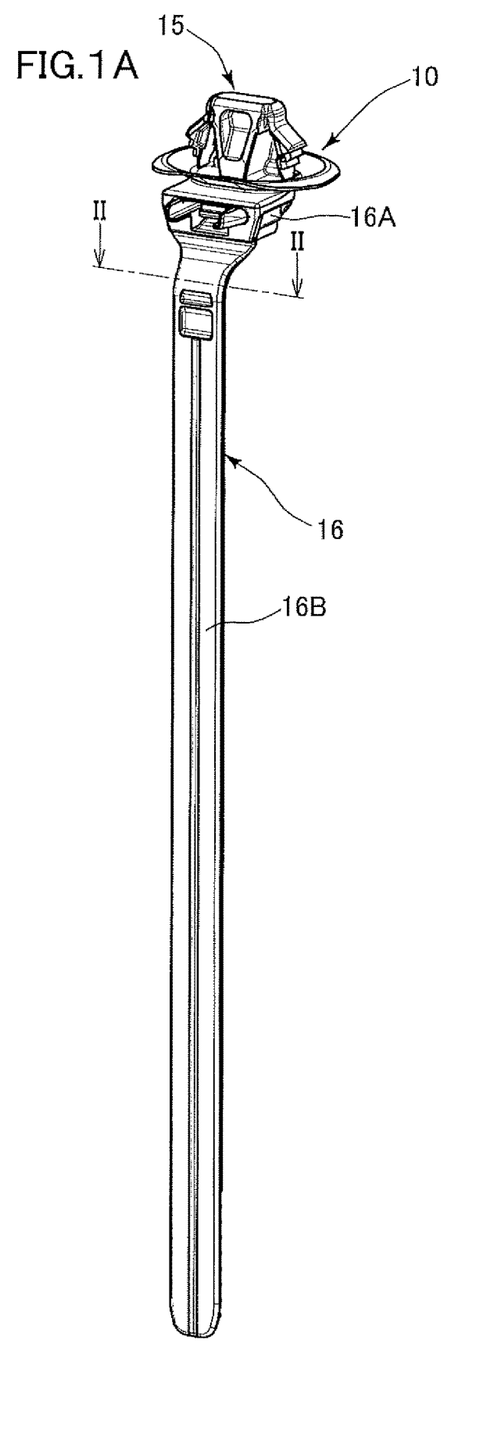
FIG. 1A is a perspective view showing a fixing member according to one embodiment.
Figure 1B:
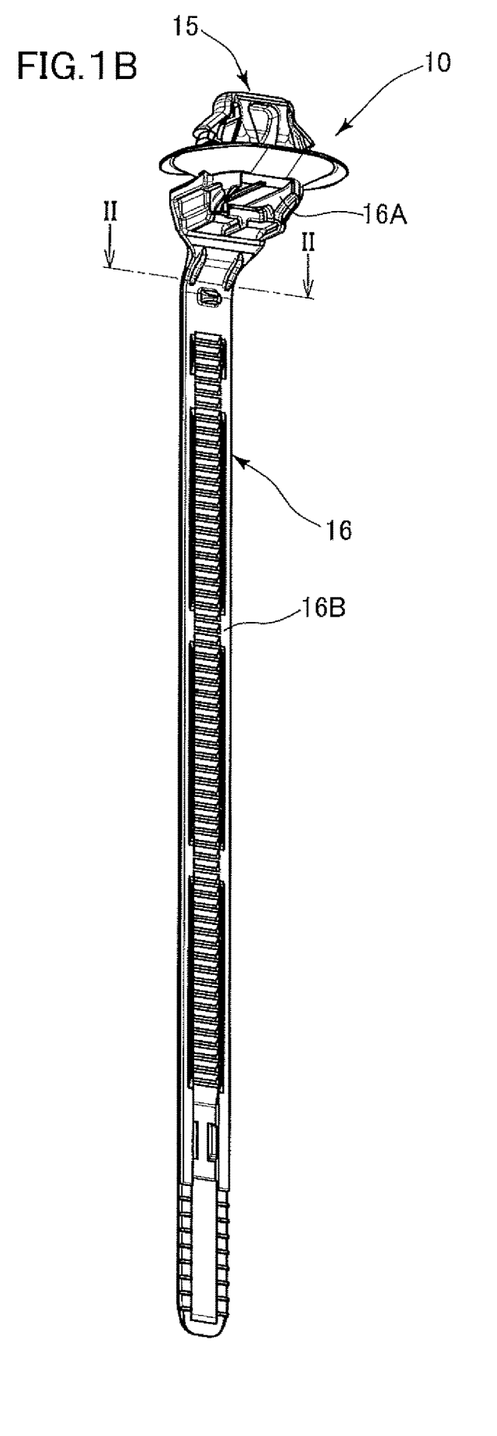
FIG. 1B is a perspective view showing the fixing member in FIG. 1A from a different angle.
Figure 2A:
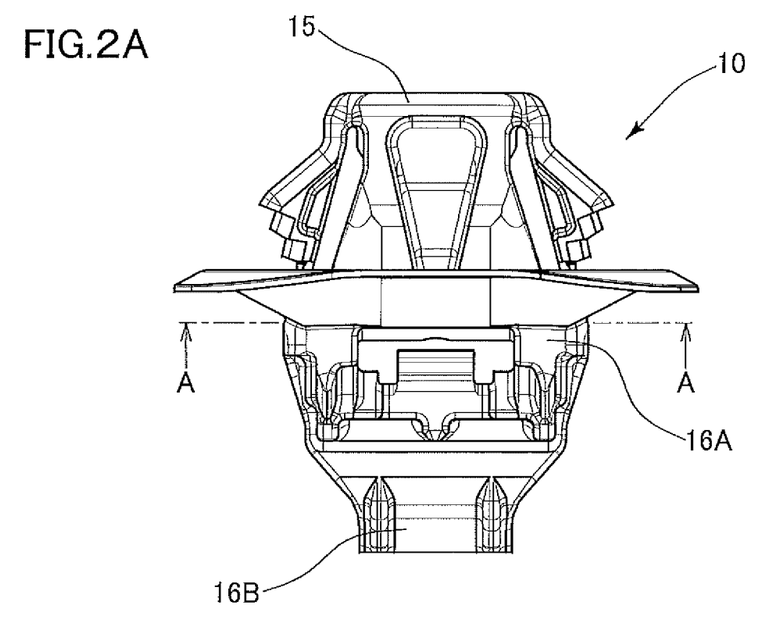
FIG. 2A is a partially-enlarged front view of FIG. 1.
Figure 2B:
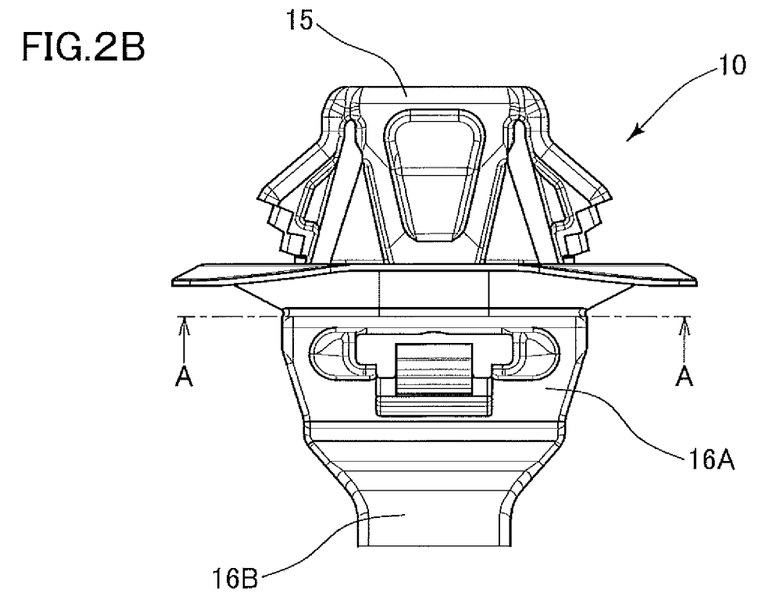
FIG. 2B is a partially-enlarged rear view of FIG. 1.

Hereinafter, an embodiment of this disclosure will be described with reference to the drawings. FIG. 1A and FIG. 1B are a perspective view of a fixing member 10 according to this embodiment as seen from above and a perspective view of the fixing member 10 as seen from below. FIG. 2A and FIG. 2B are enlarged views of the upper side of II-II cross-sections of the fixing member 1 in FIG. 1A and FIG. 1B.

The fixing member 10 shown in FIG. 1A, FIG. 1B, FIG. 2A, and FIG. 2B is a resin molded article, and includes an engagement part 15 which is inserted and fixed in a through hole 101 (see FIG. 7 and FIG. 8) of a plate-shaped member 100, and a functional part 16 which is located below the engagement part 15 and has a predetermined function. Accordingly, the fixing member 10 allows the functional part 16 to function in a state of being fixed to the plate-shaped member 100.

Figure 3:
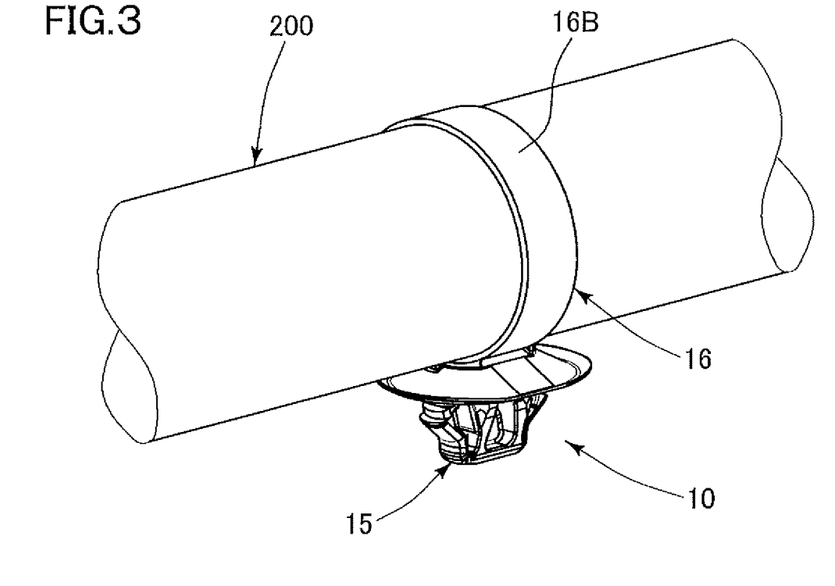
FIG. 3 is a perspective view illustrating a use state of the fixing member in FIG. 1A.
Figure 4:
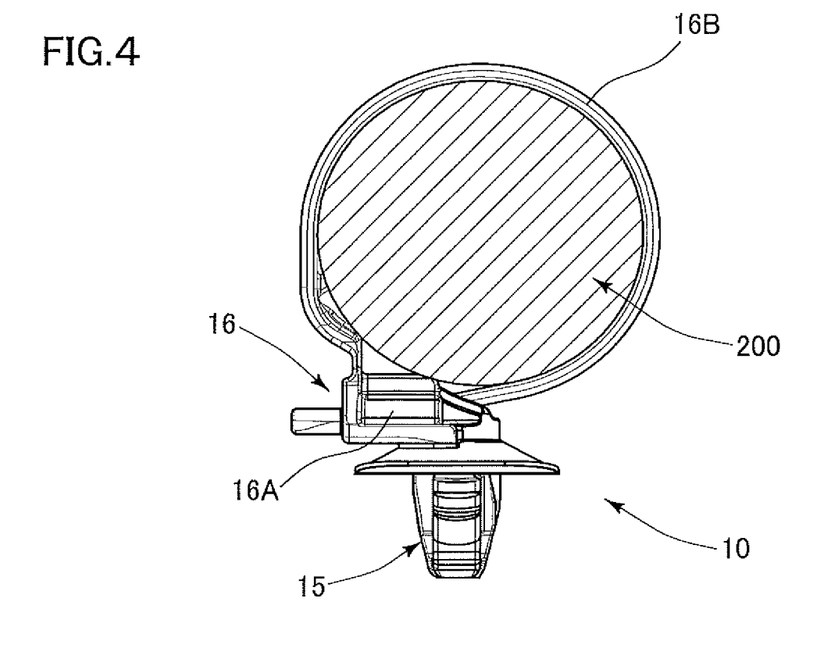
FIG. 4 is a cross-sectional view of FIG. 3 as seen from the side surface side.

The functional part 16 is provided as a longitudinal routing material holding part. Specifically, as shown in FIG. 3 and FIG. 4, the functional part 16 is a known binding part (e.g., wire harness holding part) including a belt portion 16B for surrounding the outer periphery of a longitudinal routing material 200 (e.g., wire harness) and a buckle portion 16A capable of receiving and fixing the belt portion 16B from a distal end side of the belt portion 16B.

Figure 5:
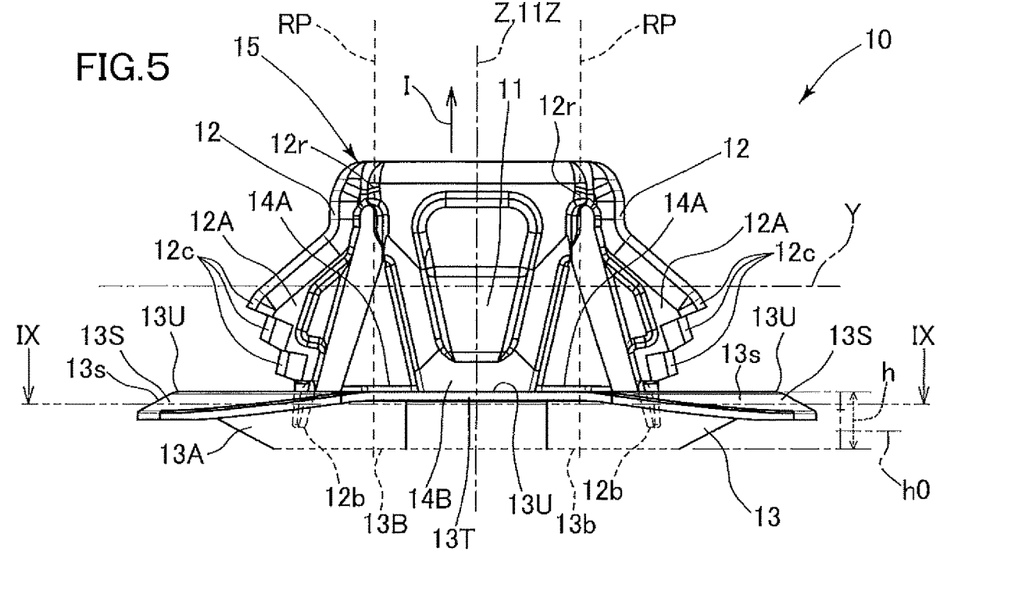
FIG. 5 is an enlarged rear view of an engagement part in FIG. 2A.
Figure 6:
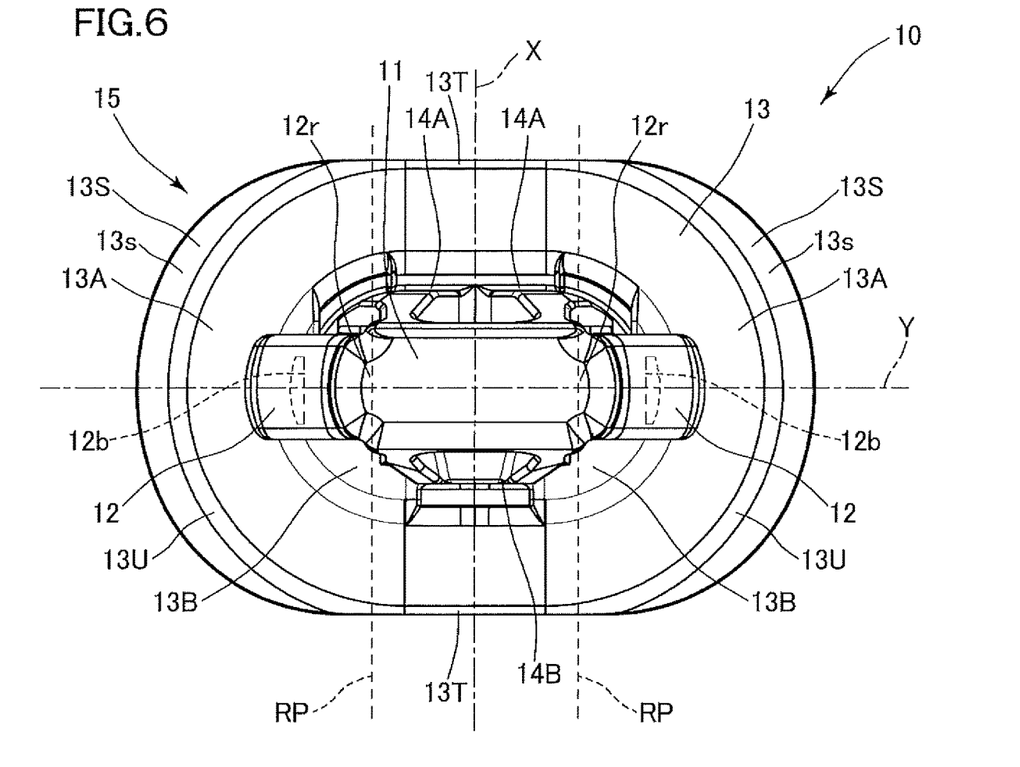
FIG. 6 is an enlarged plan view of the engagement part in FIG. 2A.

As shown in FIG. 5 and FIG. 6, the engagement part 15 includes: a support column 11 which extends in an up-down direction Z; elastic locking pieces 12 which are paired such that the support column 11 is interposed therebetween from the right and left sides (in a right-left direction Y), each extend from a support column upper end side toward a support column lower end side, and each have a locking portion 12A at a distal end portion thereof, and a dish-shaped (skirt-shaped) dish-like contact portion 13 (radially-extending contact portion) which is connected to the lower end side of the support column 11 and radially extends obliquely upward and outward so as to surround the support column 11. The mutually orthogonal up-down direction Z and right-left direction Y and a front-back direction X orthogonal thereto are directions that are set for the sake of convenience to describe a three-dimensional shape, and, for example, the direction in which the support column 11 extends does not have to coincide with the up-down direction Z (gravity direction).

Figure 7:
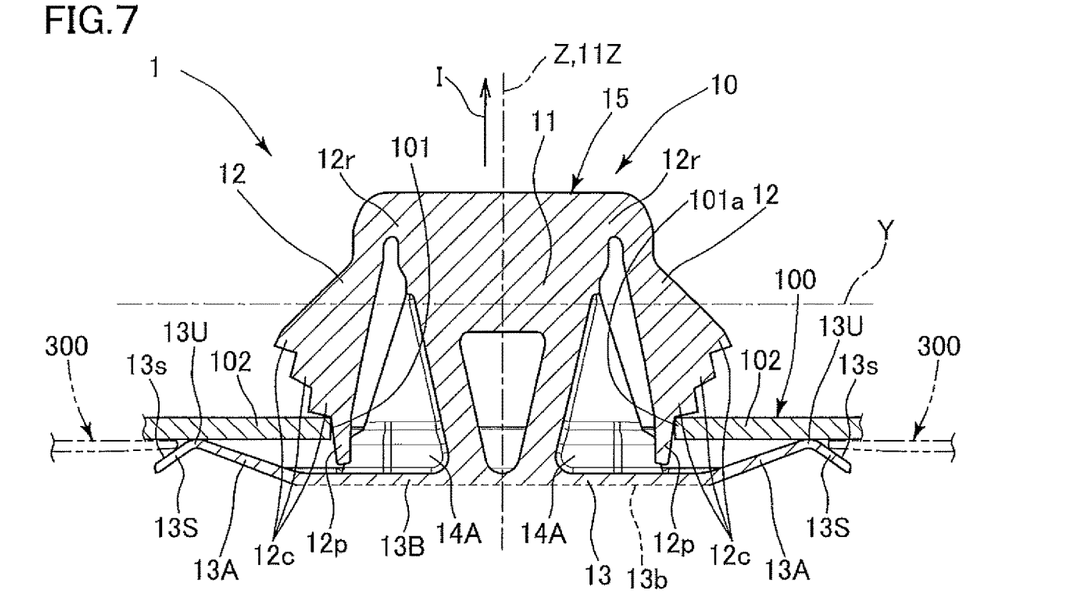
FIG. 7 is a cross-sectional view showing an engagement and fixation state of the engagement part in FIG. 2A with respect to an insertion hole (fixing structure)

As shown in FIG. 7, the engagement part 15 is inserted and fixed in the through hole 101 of the plate-shaped member 100 by inserting the support column 11 and the elastic locking pieces 12 into the through hole 101 from the support column upper end side (in an insertion direction I). Upon insertion, the paired elastic locking pieces 12 pass through the through hole 101 while narrowing the widths thereof with inward elastic deformation approaching the support column 11, and when the elastic locking pieces 12 pass through the through hole 101 and reach a predetermined engagement position, the elastic locking pieces 12 elastically return (do not have to fully return to a natural state) and widen. At this time, each locking portion 12A projects downward through the inside of the through hole 101, presses outward an inner wall surface 101a, and comes into a locking state (pull-out prevention state) of locking a surrounding portion 102 of the through hole 101 from the upper side (far side in the insertion direction I). Meanwhile, the dish-like contact portion 13 is not inserted into the through hole 101, and comes into a pressing state (contact state) of annularly contacting and pressing the surrounding portion 102 of the through hole 101 from the lower side (near side in the insertion direction I). As a result, the plate-shaped member 100 comes into an engagement and fixation state of being sandwiched (specifically, compressed) from the upper and lower sides (from the near side and the far side in the insertion direction I) at the surrounding portion 102 of the through hole 101. Accordingly, a fixing structure 1 in which the fixing member 10 is fixed to the plate-shaped member 100 is formed.

Each locking portion 12A has a locking projection portion 12c which projects outward (in a direction away from the support column 11) in the alignment direction of the paired elastic locking pieces 12 (right-left direction Y) at multiple steps (here, three steps) in a step-wise manner. By having the locking projection portion 12c at multiple steps in a step-wise manner, it is possible to handle plate-shaped members 100 having various thicknesses and various through hole shapes. In the locking projection portion 12c having multiple steps, a downward-facing surface at each step is a locking surface for locking the surrounding portion 102 of the through hole 101 from the upper side, and a surface, at each step, facing the outer side in the alignment direction Y of the elastic locking pieces 12 is a pressing surface for pressing outward the inner wall surface 101a of the through hole 101.

Figure 9:
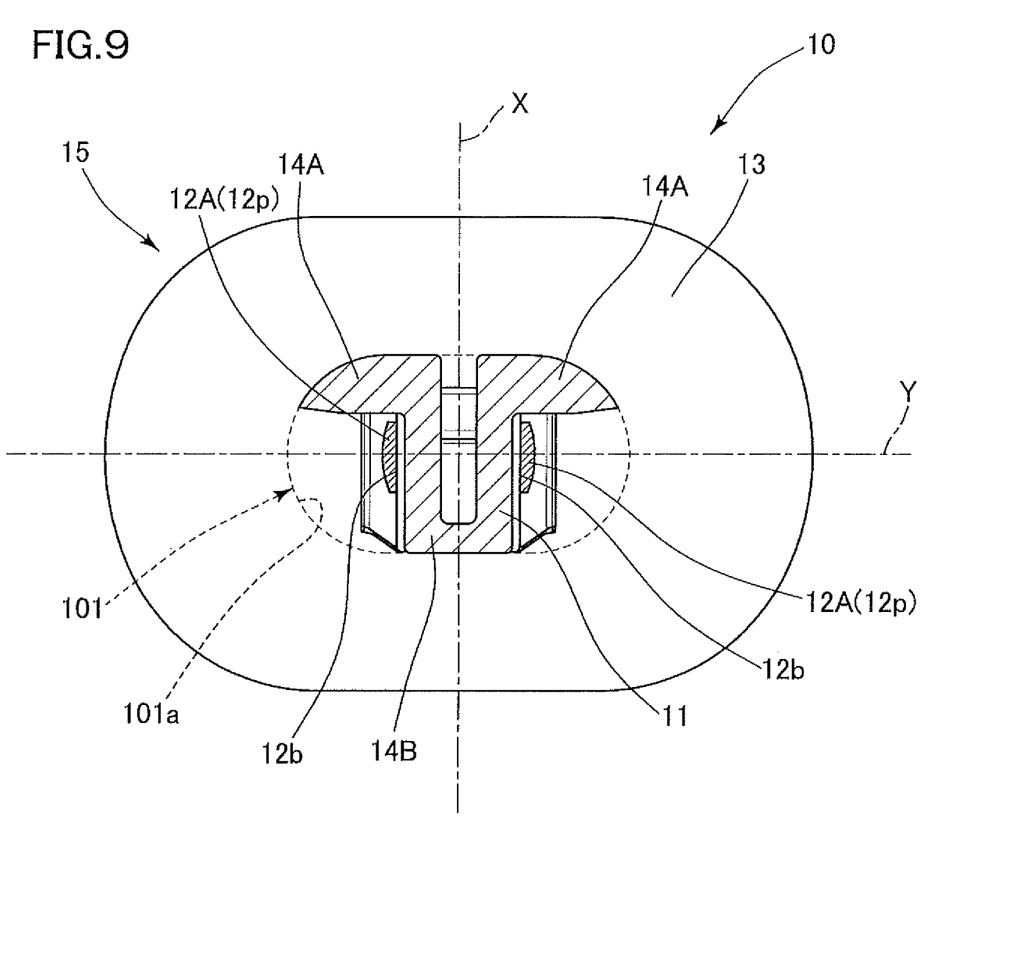
FIG. 9 is a cross-sectional view showing an IX-IX cross-section in FIG. 5.

As shown in FIG. 9, the engagement part 15 includes through hole positioning portions 14A, 14A, and 14B which come into contact with the inner wall surface 101a of the through hole 101 and position the engagement part 15 when being inserted into the through hole 101 of the plate-shaped member 100 together with the support column 11 and the elastic locking pieces 12 and the engagement and fixation state is obtained.

Meanwhile, as shown in FIG. 5 and FIG. 6, the dish-like contact portion 13 includes a bottom surface portion 13B which is connected to the support column 11, a main dish-like portion 13A which extends from the bottom surface portion 13B obliquely upward and outward in the radial direction with respect to an axis 11Z, and a bent portion 13S which is bent outward and obliquely downward from the main dish-like portion 13A. The bent portion 13S is provided on each of the sides of the paired elastic locking pieces 12. More particularly, the bent portions 13S are independently formed outside of connection positions 12r of the respective elastic locking pieces 12 with the support column 11 in the right-left direction Y (root portions of the respective elastic locking pieces 12). The dish-like contact portion 13 has a substantially elliptical shape (oval shape: including an egg shape, an oblong circular shape, an elliptical shape, a rounded rectangular shape, etc.) when seen in the direction of the axis 11Z of the support column 11 (see FIG. 6), and the bent portions 13S are formed on both sides in the major-axial direction of the dish-like contact portion 13 (here, coinciding with the Y direction).

As shown in FIG. 5 and FIG. 6, an upper surface 13s of each bent portion 13S forms a smoothly continuous curved surface around the axis 11Z of the support column 11, and is formed such that a direction from the outer edge of the curved surface when seen in the direction of the axis 11Z of the support column 11 toward a lowest end 12b of the elastic locking piece 12 in a natural state (state of not being elastically deformed) is directed upward. Specifically, each bent portion 13S is formed in an arc shape and surrounds the lowest end 12b (see FIG. 5 and FIG. 6) of the corresponding elastic locking piece 12 on the outer side in the right-left direction Y when the elastic locking piece 12 is in the natural state, and the positions of both ends of the arc shape are located on the outer side in the right-left direction Y with respect to the connection position 12r of the elastic locking piece 12 with the support column 11 (root portion of the elastic locking piece 12) (on the right or left outer side with respect to a dashed line RP in FIG. 5 and FIG. 6).

Figure 8:
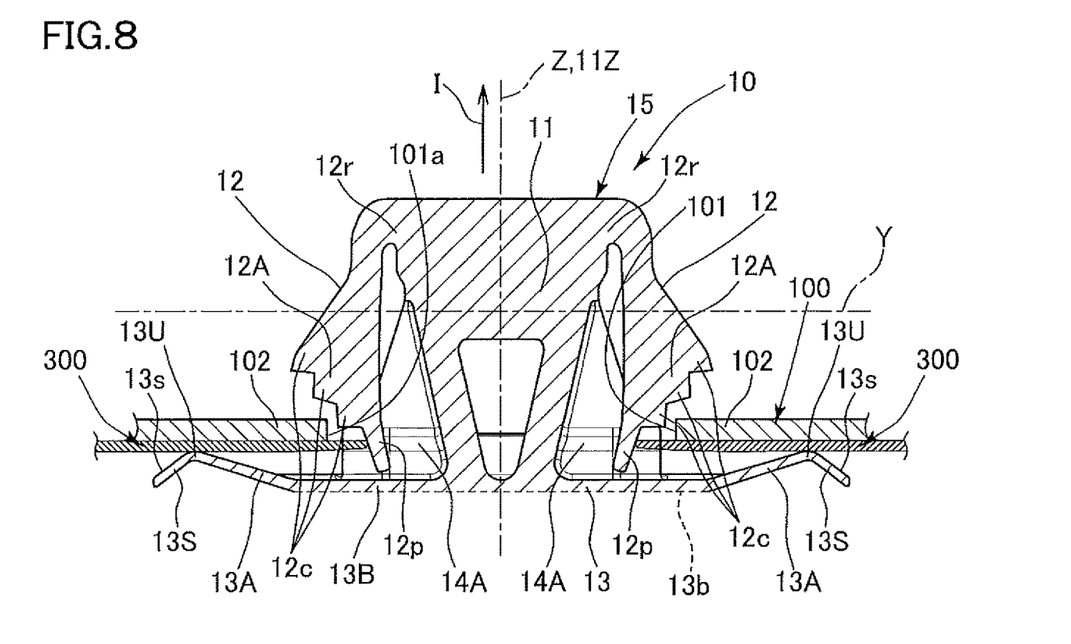
FIG. 8 is a cross-sectional view illustrating release of the engagement and fixation state in FIG. 7.

As shown in FIG. 7 and FIG. 8, the dish-like contact portion 13 in the engagement and fixation state presses the plate-shaped member 100 upward (toward the far side in the insertion direction I) by an annular end portion 13U (bent portion, annular contact portion) at an end of the main dish-like portion 13A which extends obliquely upward and outward, and also comes into a state where the end portion 13U is pressed downward and the main dish-like portion 13A is elastically deformed.

The upper surface 13s of each bent portion 13S in the engagement and fixation state faces the plate-shaped member 100 in the up-down direction Z with a gap therebetween. As shown in FIG. 6, the upper surface 13s forms a smoothly continuous arc-shaped curved surface around the axis 11Z of the support column 11, and is formed such that the direction from the outer edge of the curved surface when seen in the direction of the axis 11Z (axial direction) toward the position of the lowest end 12b of the elastic locking piece 12 in the natural state is directed upward.

As shown in FIG. 6, each bent portion 13S is formed such that the length of the bent portion 13S in the radial direction with respect to the axis 11Z of the support column 11 is longest on the outer side in the right-left direction Y with respect to the support column 11 and becomes shorter with increasing distance therefrom around the axis 11Z, and each bent portion 13S is formed so as to be smoothly connected on both end sides around the axis 11Z to non-formation portions 13T, of the dish-like contact portion 13, in which the bent portion 13S is not formed. That is, the bent portion 13S which forms an arc-shaped curved surface is formed such that the slope length is longer (the slope width is wider) the closer to a center portion of the arc shape, and the slope length is shorter (the slope width is narrower) the closer to both end sides of the arc shape. Specifically, the bent portion 13S is formed such that the length of the bent portion 13S is almost the same until the distance from the outer side in the alignment direction Y (opposing direction of the elastic locking pieces 12) along the arc shape reaches a certain distance, and becomes shorter with further increasing the distance therefrom around the axis 11Z. Each bent portion 13S is smoothly connected to the non-formation portions 13T at both ends of the arc shape at which the length of the bent portion 13S is zero.

Each bent portion 13S is formed such that the bent portion 13S does not project downward from a bottom surface 13b (or a connection surface with the functional part 16) of the dish-like contact portion 13. As shown in FIG. 5, each bent portion 13S is formed such that the bent portion 13S does not project downward from a position h0 whose distance from the top of the dish-like contact portion 13 is ⅔ of a height h (width in the up-down direction) of the dish-like contact portion 13 (the bent portion 13S is located above the position h0), thereby limiting the length of the bent portion 13S. This is not only to avoid an increase in size, but also to avoid interference with the functional part 16 immediately below the dish-like contact portion 13.

Meanwhile, as shown in FIG. 7, in the engagement and fixation state, a part (12p) of the locking portion 12A of each elastic locking piece 12 projects downward from the through hole 101 of the plate-shaped member 100. At this time, the projecting distal end portion 12p projecting downward from the through hole 101 is hidden inside the dish-like contact portion 13 and is not exposed below the plate-shaped member 100.

The locking state (pull-out prevention state) of each elastic locking piece 12 by the locking portion 12A is released by bringing a jig 300 (see FIG. 8) into contact with the projecting distal end portion 12p and pressing the projecting distal end portion 12p toward the support column 11 side, so that it is possible to pull out the engagement part 15 from the through hole 101 in a direction opposite to the insertion direction I.

However, in order to cause the jig 300 to reach the projecting distal end portion 12p, the jig 300 has to be caused to enter the inside of the dish-like contact portion 13 while widening the space between the dish-like contact portion 13 in the pressing state and the plate-shaped member 100 (surrounding portion 102). At this time, since the bent portions 13S are formed in the dish-like contact portion 13, the jig 300 can be inserted between the dish-like contact portion 13 and the plate-shaped member 100 (surrounding portion 102) so as to slide on the upper surface 13s of each bent portion 13S, which makes it easier to widen the space therebetween. In addition, since the upper surface 13s of each bent portion 13S forms a smoothly continuous curved surface around the axis 11Z, and the curved surface is an inclined surface sloping upward toward the locking portion 12A, even if the insertion direction of the jig 300 slightly deviates around the axis 11Z, the direction can be easily corrected while sliding the jig 300 on the upper surface 13s of the bent portion 13S.

Therefore, even if the jig 300 is a flat-blade screwdriver or the like, it is easy to pull out the engagement part 15 from the through hole 101. In addition, since the jig 300 enters the inside of the dish-like contact portion 13 while sliding on the upper surface 13s of the bent portion 13S, the dish-like contact portion 13 is less likely to be damaged or broken.

The locking state (pull-out prevention state) by the locking portion 12A may be released by simultaneously pressing both elastic locking pieces 12 inward from both outer sides in the alignment direction Y of the elastic locking pieces 12 with the jig 300 such that both elastic locking pieces 12 are elastically deformed, as shown in FIG. 8, or may be released by pressing the elastic locking pieces 12 from one side toward the other side in the alignment direction Y of the elastic locking pieces 12 with the jig 300 such that both elastic locking pieces 12 are elastically deformed.

As described above, the fixing structure 1 (see FIG. 7) according to this embodiment in which the fixing member 10 is engaged and fixed to the plate-shaped member 100 is not only a structure in which the fixing member 10 can be removed by the jig 300 (see FIG. 8), but also a structure in which, since the bent portions 13S are formed in the dish-like contact portion 13, it is easy to insert the jig 300, and the possibility of damaging or breaking the dish-like contact portion 13 when inserting the jig 300 can be greatly reduced.

Although one embodiment of this disclosure has been described above, this embodiment is merely illustrative, this disclosure is not limited thereto, and various modifications such as additions and omissions may be made on the basis of the knowledge of a person skilled in the art without departing from the scope of the claims.

Figure 10A:
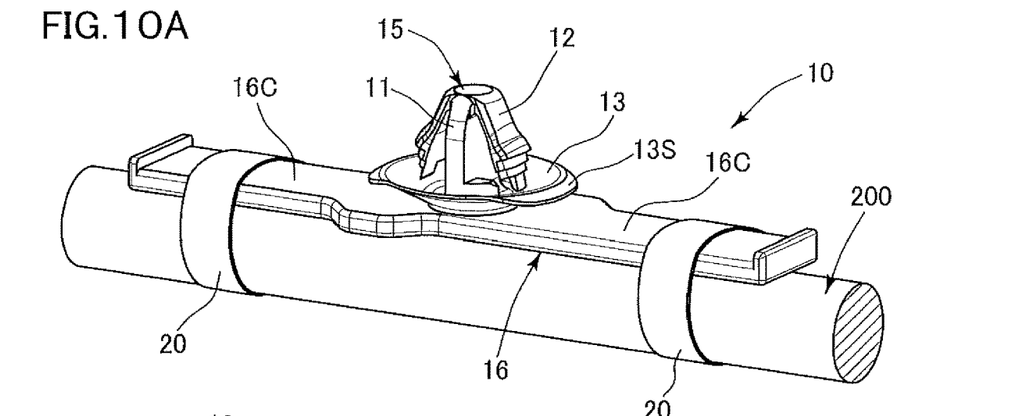
FIG. 10A is a perspective view showing a fixing member according to a first modification.
Figure 10B:
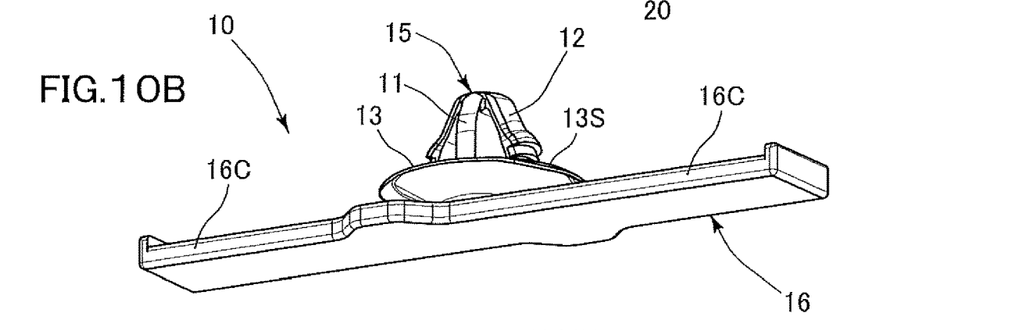
FIG. 10B is a perspective view showing the fixing member in FIG. 10A from a different angle.
Figure 10C:
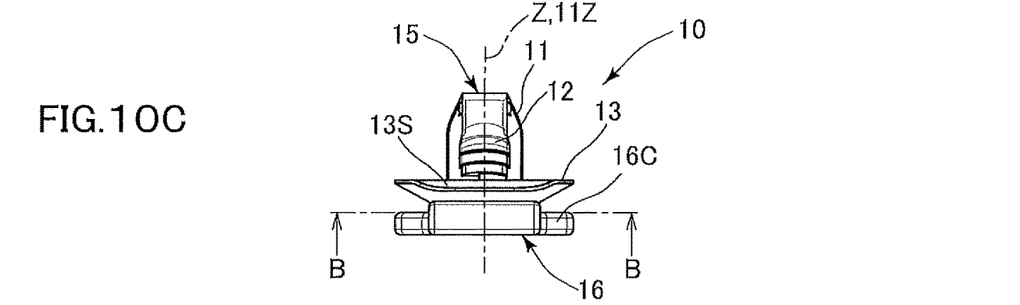
FIG. 10C is a side view of FIG. 10A.
Figure 10D:
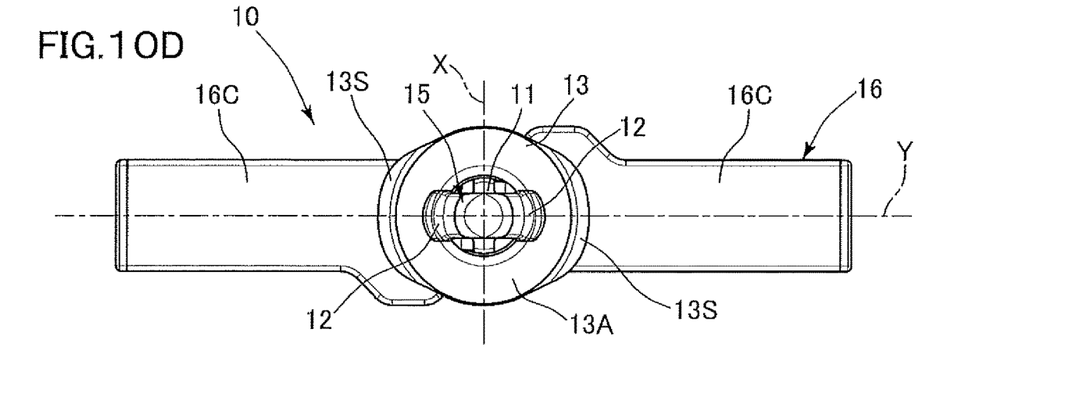
FIG. 10D is a plan view of FIG. 10A.

A first modification of the above embodiment will be described with reference to FIG. 10A to FIG. 10D. FIG. 10A is a perspective view showing a use state of a fixing member 10 according to the first modification, FIG. 10B is a perspective view of the fixing member 10 according to the first modification as seen in a direction different from that in FIG. 10A, and FIG. 10C and FIG. 10D are a right side view and a plan view of the fixing member 10 according to the first modification. A left side view of the fixing member 10 according to the first modification is the same as FIG. 10C, which is a right side view, or is represented so as to be bilaterally symmetrical to FIG. 10C.

The dish-like contact portion 13 of the above embodiment has a substantially elliptical shape whose major-axis direction is the alignment direction Y of the paired elastic locking pieces 12, when seen in the direction of the axis 11Z of the support column 11, and the bent portions 13S are formed at both ends in the major-axis direction of the dish-like contact portion 13, respectively. However, the dish-like contact portion 13 of the fixing member 10 of the first modification has a main dish-like portion 13A which has a substantially perfectly circular shape (here, which is perfectly circular) when seen in the direction of the axis 11Z of the support column 11, and bent portions 13S are provided at both ends in the alignment direction Y of the paired elastic locking pieces 12, respectively (see FIG. 10D).

The functional part 16 of the fixing member 10 of the first modification has a function of holding the longitudinal routing material 200 (e.g., wire harness) as in the above embodiment, but has a different holding manner. That is, while the functional part 16 of the above embodiment binds and holds the longitudinal routing material 200 by the belt portion 16B, the functional part 16 of the first modification has a shape having plate-shaped sleeve portions 16C extending from the lower end of the engagement part 15 in a predetermined direction orthogonal to the up-down direction Z. The longitudinal routing material 200 is placed on the bottom surfaces of the plate-shaped sleeve portions 16C, and the placed longitudinal routing material 200 is bound by binding members 20 such as tape together with the sleeve portions 16C to obtain a holding state (see FIG. 10A).

Figures 11A, 11B, 11C, 11D, 11E:
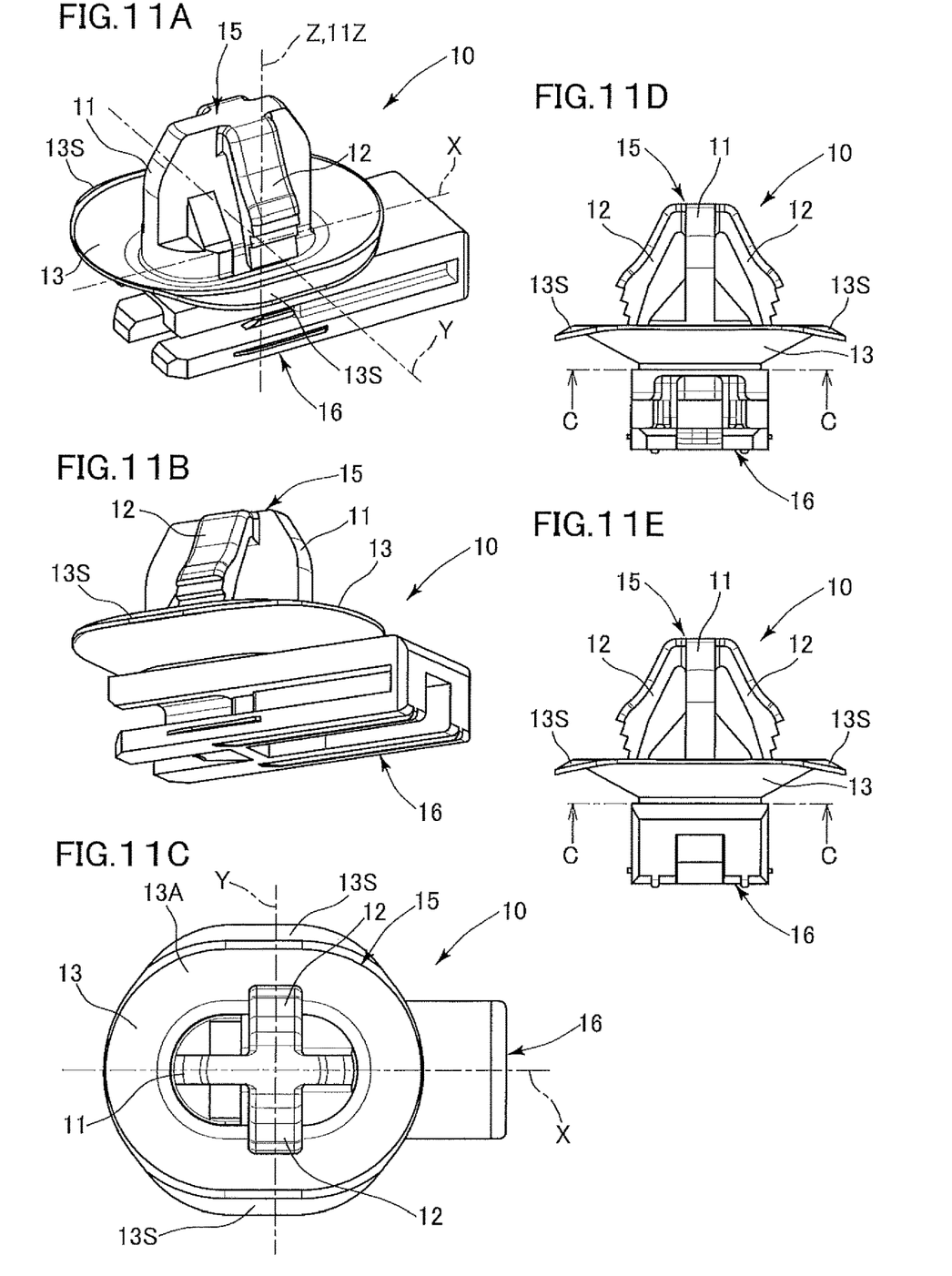
FIG. 11A is a perspective view showing a fixing member according to a second modification.
FIG. 11B is a perspective view showing the fixing member in FIG. 11A from a different angle.
FIG. 11C is a plan view of FIG. 11A.
FIG. 11D is a front view of FIG. 11A.
FIG. 11E is a rear view of FIG. 11A.
Figure 12:
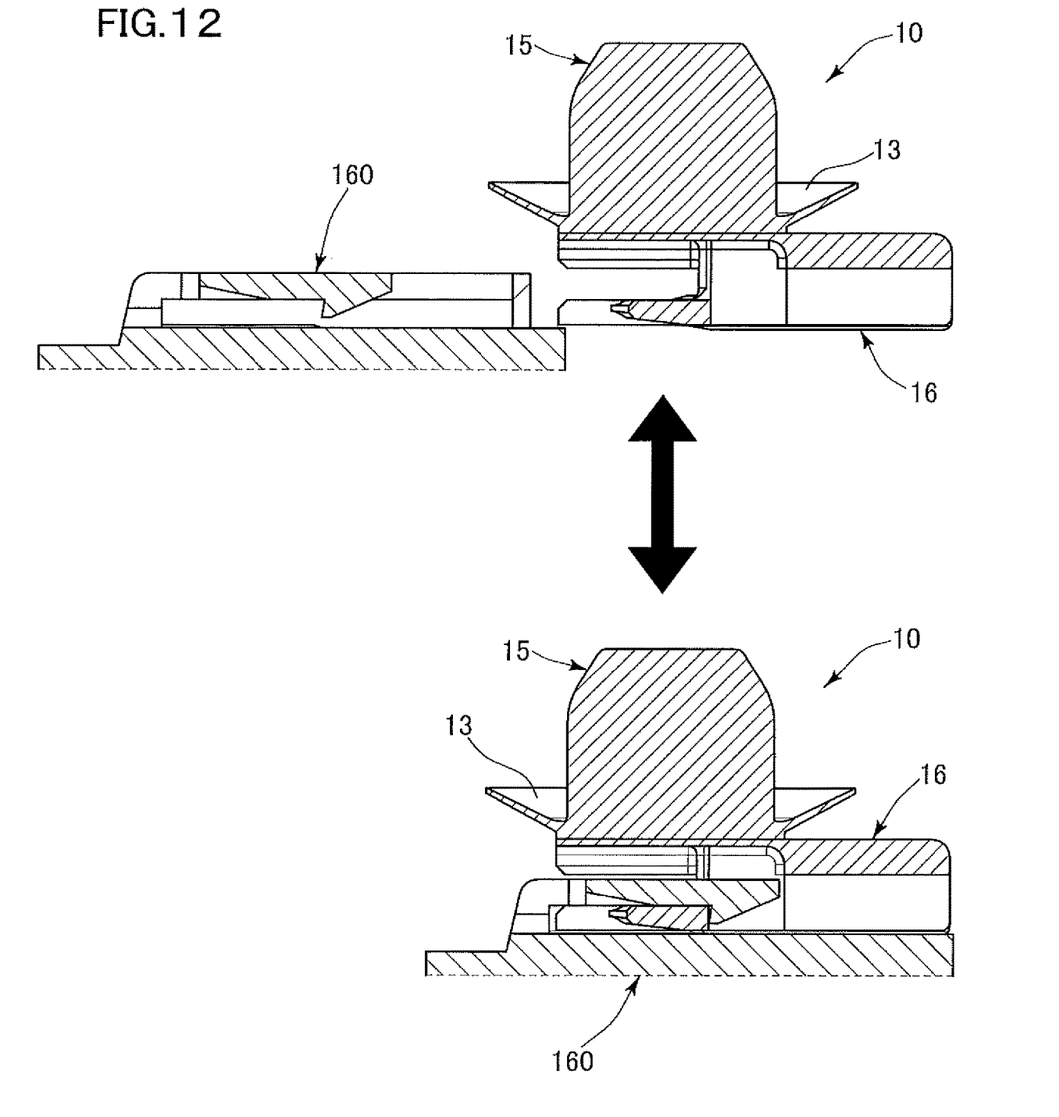
FIG. 12 is a cross-sectional view showing a method for using a functional part included in the fixing member in FIG. 11A.

A second modification of the above embodiment will be described with reference to FIG. 11A to FIG. 11E and FIG. 12. FIG. 11A and FIG. 11B are a perspective view of a fixing member 10 according to the second modification as seen from above and a perspective view of the fixing member 10 as seen from below. FIG. 11C, FIG. 11D, and FIG. 11E are a plan view, a front view, and a rear view of the fixing member 10 according to the second modification. FIG. 12 illustrates a method for using the functional part 16 of the fixing member 10 in FIG. 11A to FIG. 11E.

In the second modification, the dish-like contact portion 13 of the engagement part 15 has a substantially elliptical shape whose minor-axis direction is the alignment direction Y of the paired elastic locking pieces 12, when seen in the direction of the axis 11Z of the support column 11, and the bent portions 13S are formed at both ends in the minor-axis direction of the dish-like contact portion 13, respectively (see FIG. 11C). The functional part 16 is an attachment-detachment part, and a separate assembly functional part 160 having a predetermined function can be assembled to and detached from the functional part 16 (see FIG. 12). This assembling structure and method are a known structure and method, and thus the detailed description thereof is omitted. Although the entire assembly functional part 160 is not shown, the assembly functional part 160 may be a functional part for holding the longitudinal routing material 200 (e.g., wire harness) as described in the above embodiment and first modification, may be a connector or the like provided at an end portion of a wiring member, or may be any other functional part.

In the above embodiment, the first modification, and the second modification, the functional part 16 located below the engagement part 15 may be replaced.

For example, in the case of the fixing member 10 according to the above embodiment shown in FIG. 1A, FIG. 1B, FIG. 2A, and FIG. 2B, the engagement part 15 above the A-A cross-section in FIG. 2A and FIG. 2B may be left, and the functional part 16 below the B-B cross-section (see FIG. 10C) of the first modification shown in FIG. 10A to FIG. 10D may be assembled below the engagement part 15, for example, such that the front and the back thereof face in the same direction as or a direction opposite to those of the engagement part 15, or the functional part 16 below the C-C cross-section (see FIG. 11D and FIG. 11E) of the second modification shown in FIG. 11A to FIG. 11E may be assembled below the engagement part 15, for example, such that the front and the back thereof face in the same direction as or a direction opposite to those of the engagement part 15.

In the case of the fixing member 10 according to the first modification shown in FIG. 10A to FIG. 10D, the engagement part 15 above the B-B cross-section (see FIG. 10C) shown in FIG. 10C may be left, and the functional part 16 below the A-A cross-section of the above embodiment shown in FIG. 2A and FIG. 2B may be assembled below the engagement part 15, for example, such that the front and the back thereof face in the same direction as or a direction opposite to those of the engagement part 15, or the functional part 16 below the C-C cross-section (see FIG. 11D and FIG. 11E) of the second modification shown in FIG. 11A to FIG. 11E may be assembled below the engagement part 15, for example, such that the front and the back thereof face in the same direction as or a direction opposite to those of the engagement part 15.

In the case of the fixing member 10 according to the second modification shown in FIG. 11A to FIG. 11E and FIG. 12, the engagement part 15 above the C-C cross-section shown in FIG. 11D and FIG. 11E may be left, and the functional part 16 below the A-A cross-section of the above embodiment shown in FIG. 2A and FIG. 2B may be assembled below the engagement part 15, for example, such that the front and the back thereof face in the same direction as or a direction opposite to those of the engagement part 15, or the functional part 16 below the B-B cross-section (see FIG. 10C) of the first modification shown in FIG. 10A to FIG. 10D may be assembled below the engagement part 15, for example, such that the front and the back thereof face in the same direction as or a direction opposite to those of the engagement part 15.

The orientations of the engagement part 15 and the functional part 16 in a different embodiment and modifications when assembling the engagement part 15 and the functional part 16 are not limited to those described above, and the engagement part 15 and the functional part 16 may be assembled in orientations different from the above. The functional part 16 may have a different function and shape from the above embodiment and the various modifications described above.

In the above embodiment and the various modifications described above, a part of the engagement part 15 other than the dish-like contact portion 13 may be replaced. However, in this case, the bent portions 13S in the dish-like contact portion 13 need to be assembled so as to be positioned in a direction that coincides with the alignment direction Y of the elastic locking pieces 12. The engagement part 15 may have a shape different from that of the above embodiment and the various modifications described above.

In the above embodiment and the various modifications described above, the elastic locking pieces 12 are provided with the support column 11 interposed therebetween, the alignment direction Y is set for the pair of elastic locking pieces 12 between which the support column 11 is interposed, and the bent portions 13S are formed on both sides in the alignment direction Y However, in the case where there are multiple pairs of elastic locking pieces 12 between which the support column 11 is interposed, multiple alignment directions Y intersect each other, and thus bent portions 13S whose number corresponds to the number of alignment directions Y can be formed in the dish-like contact portion 13. In this case, bent portions 13S may be formed for at least one pair of elastic locking pieces 12, and bent portions 13S do not necessarily have to be formed for all the pairs of elastic locking pieces 12.

DESCRIPTION OF THE REFERENCE CHARACTERS 1 fixing structure of fixing member
10 fixing member
11 support column
11Z axis of support column
12 elastic locking piece
12A locking portion
12p projecting distal end portion (downward projection portion)
12c locking projection portion
13 dish-like contact portion
13S bent portion
13s upper surface of bent portion
15 engagement part
16 functional part (wire harness holding part)
100 plate-shaped member
101 through hole
101a inner wall surface of through hole
102 surrounding portion of through hole
200 longitudinal member (wire harness)
300 jig
I insertion direction
X front-back direction
Y right-left direction (alignment direction of elastic locking pieces)
Z up-down direction

What is claimed is:

1. A fixing member comprising:
a support column extending in an up-down direction;
elastic locking pieces paired such that the support column is interposed therebetween in a right-left direction and each elastic locking piece extending from connection positions at a support column upper end side toward a support column lower end side; and
a dish-like contact portion radially extending obliquely upward and outward from the support column lower end side so as to surround the support column, wherein
by inserting the support column and the elastic locking pieces into a through hole of a plate-shaped member from the support column upper end side, the elastic locking pieces pass through the through hole with elastic deformation approaching the support column, and when the elastic locking pieces reach a predetermined engagement position, the elastic locking pieces elastically return and project downward from the through hole to lock a surrounding portion of the through hole from a far side in an insertion direction while pressing an inner wall surface of the through hole, and the dish-like contact portion annularly contacts the surrounding portion of the through hole from a near side in the insertion direction, thereby fixing the fixing member to the plate-shaped member,
the dish-like contact portion includes a bent portion which is bent obliquely downward and outward after the dish-like contact portion extends obliquely upward and outward,
the bent portion is independently formed outside of each of the connection positions of the elastic locking pieces with the support column in the right-left direction, and
an upper surface of each bent portion forms a smoothly continuous curved surface around an axis of the support column, and is formed such that a direction from an outer edge of the curved surface when seen in an axial direction of the support column toward a lowest end of the elastic locking piece in a natural state is directed upward.

2. The fixing member according to claim 1, wherein each bent portion is formed such that a length of the bent portion in a radial direction with respect to the axis of the support column is longest on an outer side in the right-left direction with respect to the support column and becomes shorter with increasing distance therefrom around the axis, and is formed so as to be smoothly connected on both end sides around the axis to non-formation portions, of the dish-like contact portion, in which the bent portion is not formed.

3. The fixing member according to claim 1, wherein each bent portion does not project downward from a lowest surface of the dish-like contact portion.

4. The fixing member according to claim 1, further comprising a wire harness holding part below the dish-like contact portion.

5. A fixing structure comprising:
a plate-shaped member provided with a through hole; and
a fixing member provided with an engagement part including a support column extending in an up-down direction, elastic locking pieces paired such that the support column is interposed therebetween in a right-left direction and each elastic locking piece extending from connection positions at a support column upper end side toward a support column lower end side, and a dish-like contact portion radially extending obliquely upward and outward from the support column lower end side so as to surround the support column, wherein
by inserting the support column and the elastic locking pieces into the through hole of the plate-shaped member from the support column upper end side, the elastic locking pieces pass through the through hole with elastic deformation approaching the support column, and when the elastic locking pieces reach a predetermined engagement position, the elastic locking pieces elastically return and project downward from the through hole to lock a surrounding portion of the through hole from a far side in an insertion direction while pressing an inner wall surface of the through hole, and the dish-like contact portion annularly contacts the surrounding portion of the through hole from a near side in the insertion direction, thereby engaging and fixing the engagement part to the plate-shaped member, the dish-like contact portion includes a bent portion which is bent obliquely downward and outward after the dish-like contact portion extends obliquely upward and outward, the bent portion is independently formed outside of each of the connection positions of the elastic locking pieces with the support column in the right-left direction, and an upper surface of each bent portion forms a smoothly continuous curved surface around an axis of the support column, and is formed such that a direction from an outer edge of the curved surface when seen in an axial direction of the support column toward a lowest end of the elastic locking piece in a natural state is directed upward.

* * * * *